United States Patent
Capron et al.

(10) Patent No.: US 8,148,436 B2
(45) Date of Patent: Apr. 3, 2012

(54) ION/ELECTRON-CONDUCTING COMPOSITE POLYMER MEMBRANE, MANUFACTURING PROCESSES THEREOF AND PLANAR FUEL CELL CORE COMPRISING IT

(75) Inventors: Philippe Capron, Luzinay (FR); Isabelle Rougeaux, Rives (FR); Pascal Tiquet, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 1084 days.

(21) Appl. No.: 12/063,885

(22) PCT Filed: Aug. 11, 2006

(86) PCT No.: PCT/EP2006/065255
§ 371 (c)(1),
(2), (4) Date: Feb. 15, 2008

(87) PCT Pub. No.: WO2007/020242
PCT Pub. Date: Feb. 22, 2007

(65) Prior Publication Data
US 2008/0233454 A1    Sep. 25, 2008

(30) Foreign Application Priority Data
Aug. 16, 2005 (FR) ...................................... 05 52517

(51) Int. Cl.
*H01B 1/22* (2006.01)
*H01M 8/24* (2006.01)

(52) U.S. Cl. ......................................... 521/27; 252/500

(58) Field of Classification Search ............... 252/500, 252/512–514; 521/27; 429/492, 535
See application file for complete search history.

(56) References Cited

U.S. PATENT DOCUMENTS

| | | | |
|---|---|---|---|
| 5,863,672 A | 1/1999 | Ledjeff et al. | |
| 5,910,378 A * | 6/1999 | Debe et al. ................... | 429/483 |
| 5,989,741 A | 11/1999 | Bloomfield et al. | |
| 2007/0210475 A1* | 9/2007 | Pflaesterer ................... | 264/129 |
| 2010/0098993 A1* | 4/2010 | Capron et al. ................. | 429/30 |

FOREIGN PATENT DOCUMENTS

| EP | 0 482 783 | 4/1992 |
|---|---|---|
| WO | WO 02/054522 | 7/2002 |

OTHER PUBLICATIONS

English language translation of the International Preliminary Report on Patentability from corresponding International Application No. PCT/EP2006/065255, mail Jul. 9, 2008.

* cited by examiner

*Primary Examiner* — Mark Kopec
(74) *Attorney, Agent, or Firm* — Brinks Hofer Gilson & Lione

(57) ABSTRACT

The invention relates to an ion/electron-conducting composite polymer membrane (10'), which comprises at least two gas-tight ion-conducting polymer portions (11') joined together directly by a gas-tight electron-conducting polymer portion (12'). It also relates to processes that enable this membrane to be manufactured, and also to a planar fuel cell core comprising it. Applications: production of planar fuel cells used for generating electrical power intended for stationary applications, transport applications and portable and transportable applications.

29 Claims, 5 Drawing Sheets

ION/ELECTRON-CONDUCTING COMPOSITE POLYMER MEMBRANE, MANUFACTURING PROCESSES THEREOF AND PLANAR FUEL CELL CORE COMPRISING IT

This application is a National Stage application of International Application No. PCT/EP2006/065255 filed Aug. 11, 2006, the entire contents of which is hereby incorporated herein by reference. This application also claims the benefit under 35 U.S.C. §119 of French Patent Application No. 0552517, filed Aug. 16, 2005, the entire contents of which is hereby incorporated herein by reference.

TECHNICAL FIELD

The invention relates to an ion (proton or anion)/electron-conducting composite polymer membrane and to processes allowing this membrane to be manufactured.

The composite polymer membrane especially finds an application in the production of planar fuel cell cores, and in particular of cell cores that have an architecture of the type of that described in the International PCT Application published under the number WO 02/054522 [1], which are used for generating electrical power ranging from a few hundreds of milliwatts to a few hundreds of kilowatts for stationary applications, transport applications and portable and transportable applications.

Consequently, the invention also relates to a planar fuel cell core comprising such a membrane.

STATE OF THE PRIOR ART

Currently, most fuel cells are constructed based on a "sandwich" composed of two electrodes, an anode and a cathode, and an electrolyte which is inserted between these two electrodes.

The electrodes are generally composed of a diffusion layer on which an active (catalytic) layer is deposited. The electrolyte may be, itself, liquid as in the alkaline fuel cells which are conventionally referred to as AFCs, or solid as in fuel cells having a proton-conducting membrane which are conventionally referred to as PEMFCs ("proton exchange membrane fuel cells").

A different reactant arrives on the outer face of each of the two electrodes, namely a fuel, typically hydrogen, and an oxidant, typically oxygen.

The electrodes are thus the site of an electrochemical reaction (oxidation of the hydrogen taking place at the anode and reduction of the oxygen to water taking place at the cathode) so that it is possible to draw a voltage of around 1 V, at zero current, at the terminals of the two electrodes.

The low voltage produced by these fuel cells constitutes their main handicap relative to the conventional batteries, of which the individual voltage may rise up to 4 V.

To overcome this problem, it is useful to form fuel cells by stacking a large number of individual cells each comprising an anode/electrolyte/cathode sandwich, according to a technology conventionally referred to as "filter-press" technology.

However, this technology suffers from problems linked to a poor distribution of the gases in the various cells and to a loss of leak-tightness in the stack, problems which are even greater when the number of stacked cells is high.

It is this which led Ledjeff et al. to propose, in U.S. Pat. No. 5,863,672 [2], a novel fuel cell architecture in which the cell is composed of one or more stages each comprising several individual cells arranged next to one another, by combining several pairs of electrodes on both sides of a membrane composed of a solid polymer electrolyte, which makes it possible to thus artificially increase the individual voltage of the cell.

This architecture, which is called "planar architecture", since one stage is composed of several individual cells located in the same plane, is achieved by a stack of materials that are offset with respect to one another, and requires the use of electronically insulating gas distributor plates.

Considering, in particular, the complexity of producing this cell, a process has been proposed in reference [1], for manufacturing a fuel cell which takes up the principle of a planar architecture such as proposed by Ledjeff et al., but which significantly simplifies the production thereof.

With reference to the appended FIG. 1, which represents a transverse cross-sectional view of a stage 1 of the fuel cell obtained in reference [1], this stage comprises:

a composite membrane comprising ion-conducting portions 2 and electron-conducting portions 3, each electron-conducting portion being located between two ion-conducting portions while being separated from them by a pair of insulating walls 4;

a succession of anodes 5 on one side of the membrane, each anode covering both a portion of ion-conducting membrane and a portion of electron-conducting membrane;

a succession of cathodes 6 on the side of the matrix opposite to that on which the anodes are located, these cathodes being offset relative to the anodes so that the anodes and cathodes located on opposite sides cover the same portion of ion-conducting membrane but do not cover the same portion of electron-conducting membrane;

an electron collector 7 at each of the ends of the assembly; and a peripheral seal 8 located over the entire circumference of the membrane.

According to this document, the composite membrane is produced by depositing, on and in a porous matrix, a joint material to form the series of insulating walls 4, these walls delimiting, on the one hand, first matrix portions which are intended to be filled with an ion-conductive material and, on the other hand, second matrix portions intended to be filled with an electron-conductive material. Next, an ion-conductive material is deposited on said first portions and an electron-conductive material on said second portions.

Considering that it ought to be possible to further increase the electrochemical performance of this cell, by improving, on the one hand, the seal between the ion-conducting membrane portions and the electron-conducting membrane portions and, on the other hand, the electron conductivity values obtained in the "current bushings", which, when they are insufficient, may be responsible for large ohmic drops that lead to loss of performance and heating of these bushings, the inventors have set the objective of providing an ion/electron-conducting composite membrane suitable for being used in a planar fuel cell such as described in reference [1], and in giving this cell electrochemical performances greater than those obtained with the composite membrane proposed in this reference.

The inventors have additionally set the objective that this composite membrane can be manufactured by processes which are simple to implement and at a cost compatible with the manufacture of fuel cells on an industrial scale.

SUMMARY OF THE INVENTION

These objectives, and others too, are achieved by the present invention which proposes, firstly, an ion/electron-conducting composite polymer membrane, which comprises at least two gas-tight ion-conducting polymer portions joined together directly by a gas-tight electron-conducting polymer portion.

Within the context of the present invention, it is considered that a polymer portion is gas-tight when it has a gas permeability coefficient of less than $1\times10^{-10}$ cm$^2$/s/Pa and, advantageously, of less than $1\times10^{-12}$ cm$^2$/s/Pa.

According to the invention, the ion-conducting polymer portions of the membrane may be composed:
either of an intrinsically ion-conductive polymer;
or of a polymer devoid of any intrinsic ion-conducting property and that is made ion-conductive by incorporation of an ion-conductive material;
or else of an intrinsically ion-conductive polymer, the ion-conducting properties of which have been strengthened by incorporation of an ion-conductive material,
it being equally possible for the ion conduction of said polymer or of said material to be of protonic or anionic nature.

When the polymer constituting the ion-conducting polymer portions of the membrane is an intrinsically proton-conductive polymer, then this polymer may especially be chosen from perfluorinated polymers with sulphonic acid groups such as those sold under the trade marks Nafion® (DuPont de Nemours), Aciplex-S® (Asahi Chemical) or Flemion® (Dow Chemicals), and sulphonated polymers described in the literature such as sulphonated polyimides, sulphonated polyetheretherketones, sulphonated polysulphones and derivatives thereof, sulphonated polyphosphazenes and polybenzimidazoles.

When the polymer constituting the ion-conducting polymer portions of the membrane is an intrinsically anion-conductive polymer, then this polymer may especially be chosen from polymers bearing cationic groups such as quaternized derivatives of polychloromethylstyrenes, of polyanilines and of polyimides, and polyaryl sulphoniums.

When the polymer constituting the ion-conducting polymer portions of the membrane is a polymer devoid of any intrinsic ion-conducting property and that is made ion-conductive by incorporation of an ion-conductive material, then this polymer may especially be chosen from polyethylenes, polypropylenes, thermoplastic polyesters such as polyethylene terephthalates, fluoropolymers, in particular polytetrafluoroethylenes and copolymers based on tetrafluoroethylene such as poly(ethylene/tetrafluoroethylene), polyamides, polyetheretherketones and thermoplastic elastomers such as polyurethanes and ethylene/propylene/diene terpolymers.

A polytetrafluoroethylene or a copolymer based on tetrafluoroethylene is particularly preferred.

As regards the ion-conductive material capable of being incorporated into these polymers, it may especially be one of the intrinsically ion-conductive polymers mentioned previously, or a non-polymeric ion-conductive material such as a heteropolyacid, an ionic liquid or a molten salt, for example alkyl diimidazolium or aryl imidazolium salts.

According to the invention, the electron-conducting polymer portion of the membrane may be composed:
either of an intrinsically electron-conductive polymer;
or of a polymer devoid of any intrinsic electron-conducting property and that is made electron-conductive by incorporation of an electron-conductive material;
or else of an intrinsically electron-conductive polymer, the electron-conductive properties of which have been strengthened by incorporation of an electron-conductive material.

Advantageously, the electron-conducting portion of the membrane is composed of a polymer containing inclusions of an electron-conductive material, this polymer possibly being identical to, or different from, that which constitutes the ion-conductive polymer portions of the membrane.

Thus, this polymer may especially be chosen from the intrinsically ion-conductive polymers mentioned previously.

As a variant, it may also be a polyethylene, a polypropylene, a thermoplastic polyester, a fluoropolymer, a polyamide, a polyetheretherketone or a thermoplastic elastomer, a polytetrafluoroethylene or a copolymer based on tetrafluoroethylene being, in this case, particularly preferred.

The electron-conductive material present in this polymer, in the form of inclusions, may be any, as much as possible inoxidizable, material known for having electron-conducting properties such as carbon, graphite, noble metals such as platinum, gold and silver, and their alloys with transition elements (for example, Cr, Mn, Ni, Co and Fe).

Advantageously, the ion-conducting polymer portions and the electron-conducting polymer portion of the membrane are composed of the same polymer.

In this case, two embodiments of this membrane are particularly preferred, namely:
a first embodiment in which the polymer is a polymer devoid of any intrinsic ion-conducting property, in which case this polymer contains an ion-conductive material in the ion-conducting polymer portions, and inclusions of an electron-conductive material in the electron-conducting polymer portion; and
a second embodiment in which the polymer is an intrinsically ion-conductive polymer, in which case this polymer contains inclusions of an electron-conductive material in the electron-conducting polymer portion of the membrane.

In all the cases, the ion-conducting polymer portions of the membrane are, preferably, proton-conducting polymer portions.

According to the invention, the membrane is preferably in the form of a thin film, that is to say a film measuring from 20 to 300 microns in thickness and, better still, from 20 to 60 microns in thickness.

However, other forms may be envisaged, ranging from prismatic cell to spiral-wound cylinder through to a tube.

Furthermore, although the membrane can be composed only of two ion-conducting polymer portions joined together directly by an electron-conducting polymer portion, it is preferred, however, that it comprises a higher number of ion-conducting polymer portions and, therefore, a higher number of electron-conducting polymer portions.

Thus, the membrane preferably comprises n gas-tight ion-conducting polymer portions and n−1 gas-tight electron-conducting polymer portion(s), n being an integer ranging from 2 to 100 and preferably from 4 to 50, and each electron-conducting polymer portion being inserted between two ion-conducting polymer portions.

Another subject of the invention is processes that make it possible to manufacture a composite polymer membrane such as defined previously.

According to a first process, the manufacture of the composite polymer membrane comprises:
a) depositing an electron-conductive material in the pores of a porous matrix composed of a polymer and comprising at least two portions intended to be filled with an ion conductor, joined together directly by a portion intended to be filled with an electron-conductive material, this deposition being limited to the portion of the porous matrix intended to be filled with the electron-conductive material;

b) applying, to the portion of the porous matrix filled with the electron-conductive material, a treatment for obtaining the softening of the polymer that forms this matrix portion and the blocking of the pores of said matrix portion by deformation of the thus softened polymer; and c) filling, with an ion-conductive material, the porous matrix portions intended to be filled with the ion-conductive material.

According to a second process, the manufacture of the composite polymer membrane comprises:

a) depositing an electron-conductive material in the pores of a porous matrix composed of a polymer and comprising at least two portions intended to be filled with an ion-conductive material, joined together directly by a portion intended to be filled with an electron-conductive material, this deposition being limited to the portion of the porous matrix intended to be filled with the electron-conductive material;

b) filling, with an ion-conductive material, the porous matrix portions intended to be filled with the ion-conductive material, and c) applying, to the portion of the porous matrix filled with the electron-conductive material, a treatment for obtaining the softening of the polymer that forms this matrix portion and the blocking of the pores of this matrix portion by deformation of the thus softened polymer.

According to a third process, the manufacture of the composite polymer membrane comprises:

a) depositing an electron-conductive material in the pores of a porous matrix composed of a polymer;

b) cutting the porous matrix filled with an electron-conductive material into a plurality of segments;

c) forming a composite polymer membrane by inserting one of the segments obtained in step b) between at least two gas-tight ion-conducting polymer segments and firmly joining these segments together; and d) applying, to the segment of porous matrix filled with the electron-conductive material present in the composite polymer membrane obtained in step c), a treatment for obtaining the softening of the polymer that forms this matrix segment and the blocking of the pores of said matrix segment by deformation of the thus softened polymer.

According to a fourth process, the manufacture of the composite polymer membrane comprises:

a) depositing an electron-conductive material in the pores of a porous matrix composed of a polymer;

b) applying, to the porous matrix, a treatment for obtaining the softening of the polymer that forms this matrix and the blocking of the pores of said matrix by deformation of the thus softened polymer;

c) cutting the matrix obtained in step b) into a plurality of segments; and d) forming a composite polymer membrane by inserting one of the segments obtained in step c) between at least two gas-tight ion-conducting polymer segments and firmly joining these segments together.

According to the invention, in the four processes which have just been described, and most especially in the latter two, use is preferably made of a porous matrix composed of a polymer devoid of any intrinsic ion-conducting property, for example a polytetrafluoroethylene of Teflon® type (DuPont de Nemours).

According to yet a fifth process, the manufacture of the composite polymer membrane comprises:

a) depositing an electron-conductive material in the pores of a porous matrix composed of an intrinsically ion-conductive polymer and comprising at least two portions intended to remain ion-conductive, joined together directly by a portion intended to be filled with an electron-conductive material, this deposition being limited to the portion of the porous matrix intended to be filled with the electron-conductive material; and b) applying, to the porous matrix, a treatment for obtaining the softening of the polymer that forms this matrix and the blocking of the pores of said matrix by deformation of the thus softened polymer.

The latter process is particularly preferred considering its simplicity.

It will be noted that all the processes which have just been described have in common that they comprise:

an operation which consists in conferring electron-conducting properties on a porous matrix or on a portion of this matrix and this, by depositing an electron-conductive material in the pores of said matrix or of said matrix portion; and an operation which consists in making the porous matrix or the portion of porous matrix thus filled with an electron-conductive material gas-tight and this, by applying a treatment that makes it possible to soften the polymer forming this matrix or this matrix portion and to block the pores of said matrix or matrix portion by deformation of the thus softened polymer.

According to the invention, the deposition of the electron-conductive material, which may be any one of the electron-conductive materials mentioned previously, is, preferably, carried out by one of the vacuum deposition techniques conventionally used for producing thin films, and in particular by chemical vapour deposition (CVD), by physical vapour deposition (PVD) or by an "electroless" or chemical reduction process of a metal salt.

The softening of the polymer, which may also be any one of the previously mentioned polymers, may be, itself, achieved by any treatment known to a person skilled in the art for causing the softening, or even the melting, of a polymer such as heating, an ultrasound treatment or a high-frequency radiation treatment.

Ideally, this treatment is applied so as to bring the polymer to an intermediate temperature between its softening point and its melting point.

In the case where the manufacture of the composite polymer membrane comprises a step of filling porous matrix portions with an ion-conductive material, then this filling may be carried out in various ways, for example:

by impregnating these porous matrix portions with a solution containing the ion-conductive material in a solvent;

by impregnating these porous matrix portions with a solution containing a precursor of the ion-conductive material in a solvent, then by secondarily applying, to said portions, a treatment, for example a heat treatment, to induce the conversion of this precursor to said ion-conductive material; or else by depositing, on these porous matrix portions, the ion-conductive material in the form of a film, then by secondarily applying, to said portions, a treatment, for example a heat treatment, for melting this film and thus infiltrating the ion-conductive material into said porous matrix portions.

In the case where the manufacture of the composite polymer membrane comprises a step of inserting an electron-conducting polymer segment between at least two ion-conducting polymer segments and of firmly attaching these segments together, then the ion-conducting polymer segments may themselves be obtained by cutting, into segments of suitable shape and sizes, a porous matrix formed from a polymer, which may or may not be identical to the polymer forming the porous matrix filled with the electron-conductive material, that has previously been made ion-conductive by filling with an ion-conductive material.

As a variant, it is also possible that these segments come from one part formed from an ion-conductive polymer, for example by moulding, and that it has previously been cut into segments of suitable shape and sizes.

As regards the firm attachment of the segments, this may especially be carried out by hot pressing.

Be that as it may, via these processes composite polymer membranes are obtained of which the electron-conducting polymer portion or portions have a particularly high electron conductivity (generally greater than 1 S/cm) twinned with a perfect gas-tightness.

The processes according to the invention are therefore extremely advantageous as they make it possible to manufacture composite polymer membranes suitable for being incorporated into the composition of planar fuel cell cores, especially of the type of that described in reference [1], and for improving, through their properties, the electrochemical performances of these cells, while simplifying their manufacture as it is no longer necessary to produce pairs of insulating walls and as it becomes possible to integrate the peripheral seals at the same time as the membranes.

Another subject of the invention is therefore a planar fuel cell core comprising:
- a composite polymer membrane such as defined previously;
- a plurality of anodes arranged on one side of this membrane; and
- a plurality of cathodes arranged on the side of this membrane opposite to that where the plurality of anodes is located.

Other features and advantages of the invention will appear more clearly on reading the remainder of the description which follows, which relates to examples of manufacturing ion/electron-conducting composite polymer membranes according to the invention, and which refers to the appended figures.

Of course, these examples are only given by way of illustrations of the subject of the invention and do not in any case constitute a limitation of this subject.

In these figures, the proportions of the composite polymer membranes and of the components which form them have been deliberately exaggerated for the sake of clarity.

EXAMPLES

Figure 1:
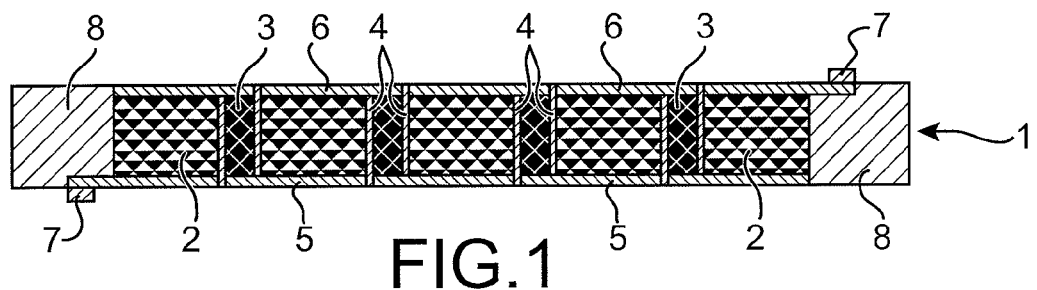
FIG. 1 schematically illustrates one stage of a fuel cell according to the reference [1], seen as a transverse cross section.
Figure 2A:
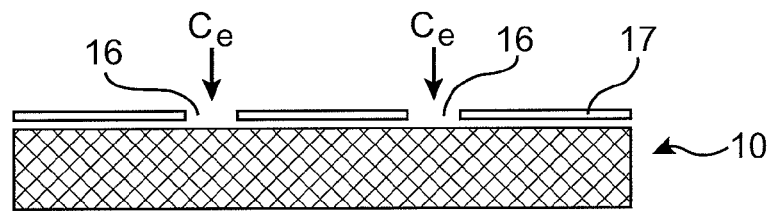
FIGS. 2a to 2d schematically illustrate a first example of manufacturing an ion-conducting/electron-conducting composite polymer membrane according to the invention.
Figure 2B:
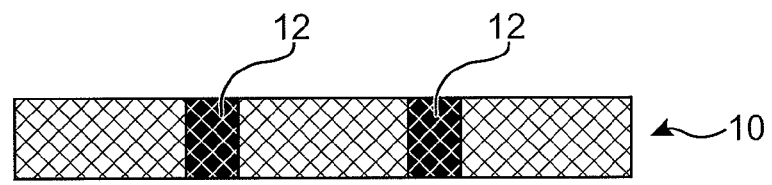

Reference will first be made to FIGS. 2a to 2b which schematically illustrate a first example of manufacturing an ion/electron-conducting composite polymer membrane 10' according to the invention.

Figure 2C:
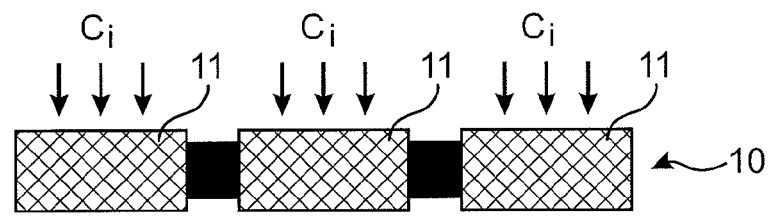
Figure 2D:
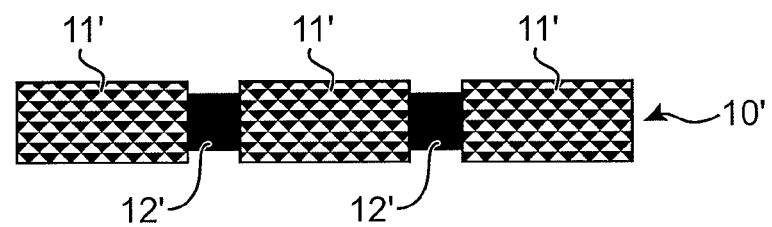

This membrane, which is represented in FIG. 2d, seen as a transverse cross section, comprises three gas-tight ion-conducting polymer portions 11' and two electron-conducting polymer portions 12', which are also gas-tight, each electron-conducting portion 12' being inserted between two ion-conducting portions 11'.

In this example, the membrane is manufactured by treating a porous matrix composed of a polymer devoid of any intrinsic ion-conducting property, and of which:
- three first portions are intended to form the ion-conducting portions 11' of the membrane and, therefore, to be filled with an ion-conductive material; and
- two other portions are intended to form the electron-conducting portions 12' of the membrane and, therefore, to be filled with an electron-conductive material.

It goes without saying that the shape and the dimensions of the porous matrix are therefore chosen as a function of the shape and dimensions that must be presented by the membrane.

In this particular case, the membrane is in the form of a film, the porous matrix is also in the form of a film as is illustrated by FIG. 2a which shows this matrix, referenced 10, seen as a transverse cross section.

The first step consists in depositing an electron-conductive material in the portions of the porous matrix 10 intended to form the electron-conducting portions 12' of the membrane 10'.

In order to do this and as can be seen in FIG. 2a, after having covered one of the main sides of the porous matrix with a mechanical mask 17, which is equipped with two openings 16 whose position and size are chosen as a function of the portions of the matrix that it is desired to fill with the electron-conductive material, the electron-conductive material ($C_e$) is deposited, for example by CVD, PVD or an "electroless" process, in the only portions of the matrix which are located opposite these openings. Then, this matrix is turned over and the same operation is restarted on the other of its main sides.

Thus, the matrix 10 shown in FIG. 2b is obtained.

The second step consists in applying, to the two portions 12 of this matrix which have been filled with an electron-conductive material, a treatment that makes it possible to obtain, at these portions alone, the softening of the polymer that forms the matrix and the blocking of the pores of this matrix by deformation of rendered gas-tight and the matrix 10 shown in FIG. 2c is obtained.

The third step, which is illustrated by FIG. 2c, consists, itself, in filling, with an ion-conductive material ($C_i$), the three portions 11 of the matrix 10 which are intended to form the ion-conducting portions 11' of the membrane and which are, themselves, still porous. Via this filling, these portions are, in turn, rendered gas-tight.

Thus, the membrane 10' shown in FIG. 2d is obtained.

Figure 3A:
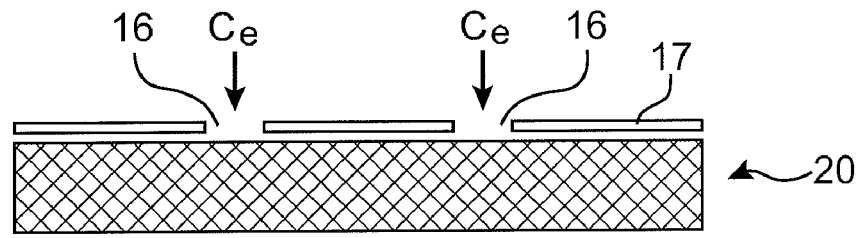
FIGS. 3a to 3d schematically illustrate a second example of manufacturing an ion-conducting/electron-conducting composite polymer membrane according to the invention.
Figure 3B:
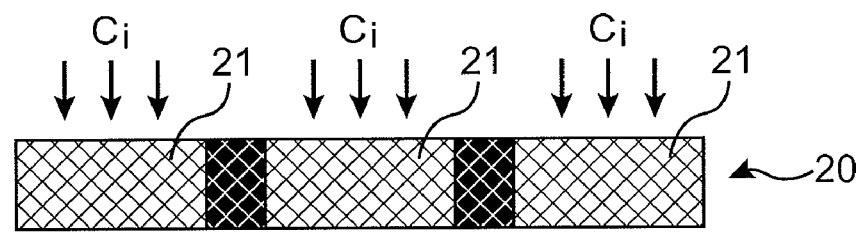

Reference is now made to FIGS. 3a to 3b which schematically illustrate a second example of manufacturing an ion/electron-conducting composite polymer membrane 20' according to the invention.

Figure 3C:
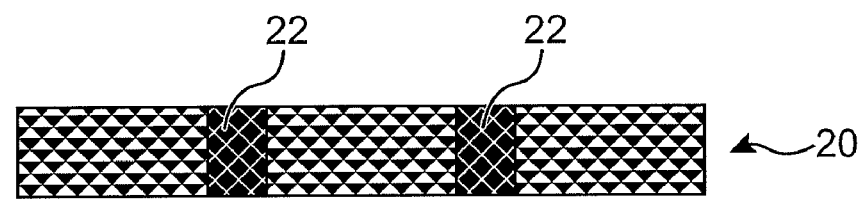
Figure 3D:
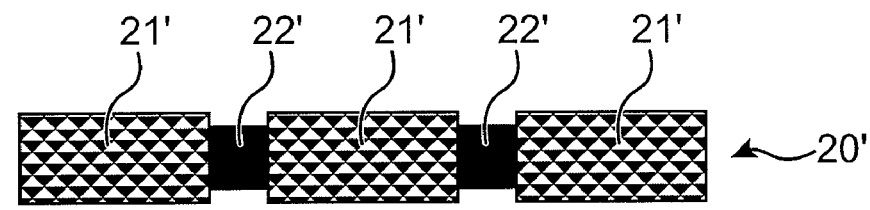

This membrane, which is represented in FIG. 3d, seen as a transverse cross section, comprises, as in the preceding example, three gas-tight ion-conducting polymer portions 21', joined together by two gas-tight electron-conducting polymer portions 22'.

In this example, the membrane is also manufactured by treating a porous matrix composed of a polymer devoid of any intrinsic ion-conducting property, and the same steps as those described in the preceding example are repeated, except that the order of the last two steps is reversed.

Thus, after the step, illustrated by FIG. 3a, of depositing an electron-conductive material in the only portions of a porous matrix 20 which are intended to form the electron-conducting portions 22' of the membrane, the manufacture of the latter has:

for a second step, the filling, with an ion-conductive material, of the three portions 21 of the matrix 20 which are intended to form the ion-conducting portions 21' of the membrane, this step being illustrated by FIG. 3b and resulting in the matrix shown in FIG. 3c; and for a third step, the application, to the two portions 22 of the matrix 20 which are filled with the electron-conductive material, of a treatment suitable for softening the polymer that forms these matrix portions and the blocking of the pores of these matrix portions by deformation of the thus softened polymer.

Thus, the membrane 20' shown in FIG. 3d is obtained.

FIGS. 4a to 4d schematically illustrate a third example of manufacturing an ion/electron-conducting composite polymer membrane 36 according to the invention.

Figure 4A:
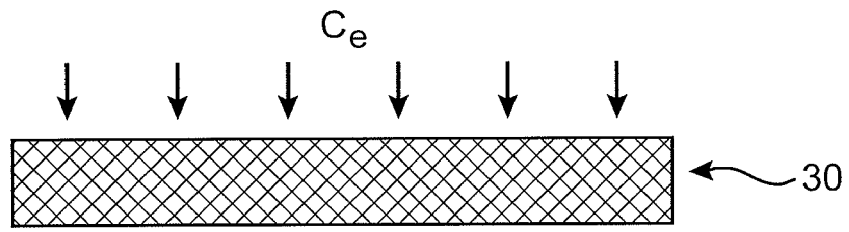
FIGS. 4a to 4d schematically illustrate a third example of manufacturing an ion-conducting/electron-conducting composite polymer membrane according to the invention.
Figure 4B:
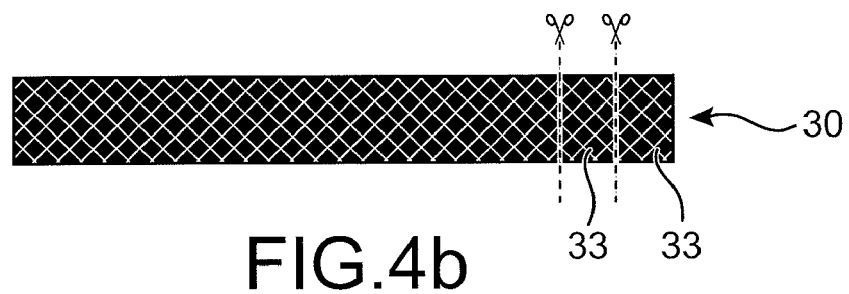
Figure 4C:
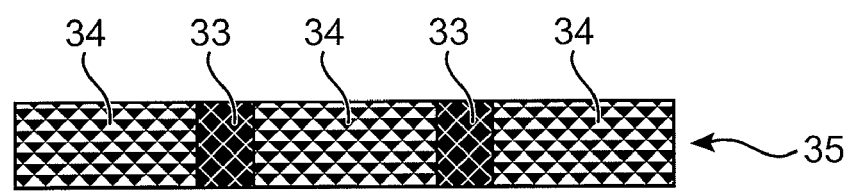
Figure 4D:
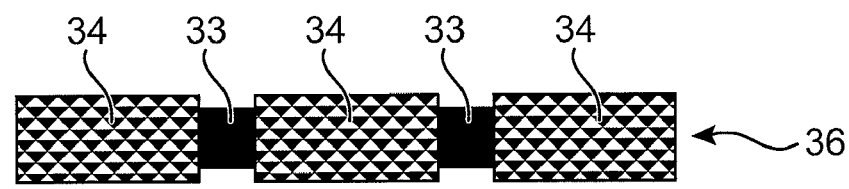

This membrane, which is represented in FIG. 4d, seen as a transverse cross section, comprises, as in the preceding examples, three gas-tight ion-conducting polymer portions 34 and two gas-tight electron-conducting polymer portions 33, each electron-conducting portions 34.

In this example, the composite polymer membrane is manufactured by assembling two electron-conducting segments, obtained by depositing an electron-conductive material in a porous matrix composed of a polymer devoid of any intrinsic ion-conducting property, and cutting of this matrix, with three ion-conducting segments obtained independently of said electron-conducting segments.

Thus, in this case, it is not necessary for the porous matrix to have a shape and dimensions corresponding to those of the membrane that has to be manufactured.

The first step consists, therefore, in depositing an electron-conductive material in the assembly of a porous matrix 30, as can be seen in FIG. 4a.

Then, the second step, which is illustrated by FIG. 4b, consists in cutting the porous matrix 30 thus filled with electron-conductive material into at least two segments 33.

Next, as shown by FIG. 4c, a composite membrane 35 is formed by inserting two segments 33 between three ion-conducting segments 34 obtained elsewhere, and these segments are firmly attached together, for example by hot pressing.

A treatment is then applied to the two porous matrix segments 33 coated with electron-conductive material that are present in the membrane 35 thus formed that makes it possible to obtain the softening of the polymer that forms these matrix segments and the blocking of the pores of said matrix segments by the thus softened polymer.

Thus, the membrane 36 shown in FIG. 4d is obtained.

FIGS. 5a to 5d schematically illustrate a fourth example of manufacturing an ion-conducting/electron-conducting composite polymer membrane 46 according to the invention.

Figure 5A:
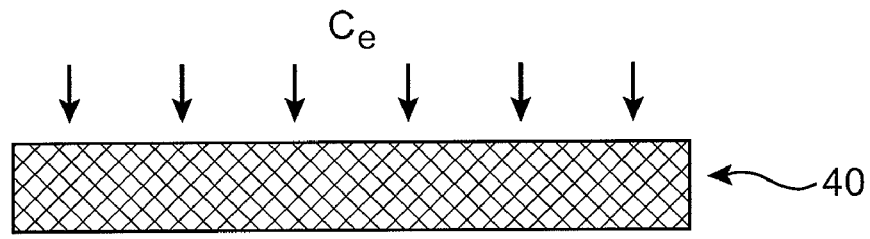
FIGS. 5a to 5d schematically illustrate a fourth example of manufacturing an ion-conducting/electron-conducting composite polymer membrane according to the invention.
Figure 5B:
Figure 5C:
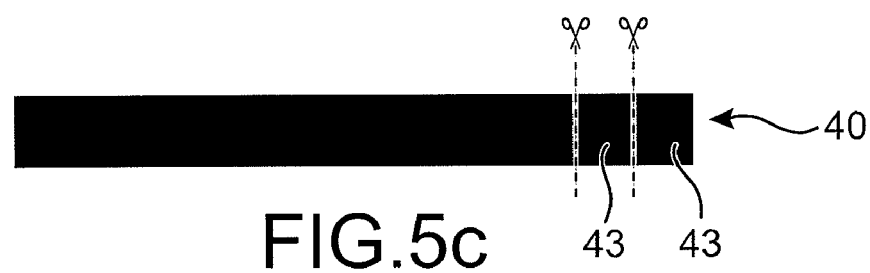
Figure 5D:
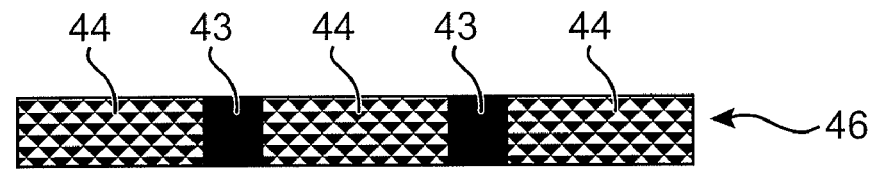

This membrane, which is represented in FIG. 5d, seen as a transverse cross section, comprises, as in the preceding examples, three gas-tight ion-conducting polymer portions 44 and two gas-tight electron-conducting polymer portions 43, each electron-conducting portion 43 being inserted between two ion-conducting portions 44.

In this example, the same steps as those described in the preceding example are repeated, apart from the fact that the order of the last three steps is reversed.

Thus, after the step of depositing an electron-conductive material in a porous matrix 40, the manufacture of the membrane has:

for a second step, the application to this porous matrix of a treatment that makes it possible to obtain the softening of the polymer which forms it and the blocking of the pores of this matrix by deformation of the thus softened polymer, this step making it possible to obtain the matrix shown in FIG. 5b;

for a third step, the cutting of the matrix thus obtained into at least two segments 43, this step being illustrated by FIG. 5c; and for a fourth step, the formation of the membrane by inserting two segments 43 between three ion-conducting segments 44 obtained elsewhere, and firmly attaching these segments together, for example by hot pressing.

Thus, the membrane 46 shown in FIG. 5d is obtained.

Figure 6A:
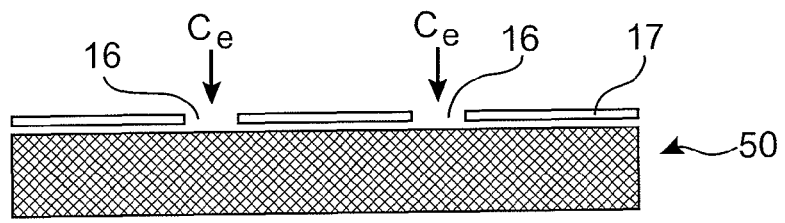
FIGS. 6a to 6c schematically illustrate a fifth example of manufacturing an ion-conducting/electron-conducting composite polymer membrane according to the invention.
Figure 6B:
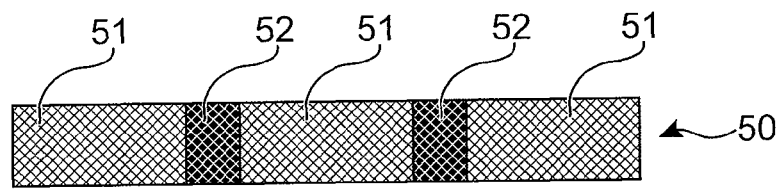
Figure 6C:
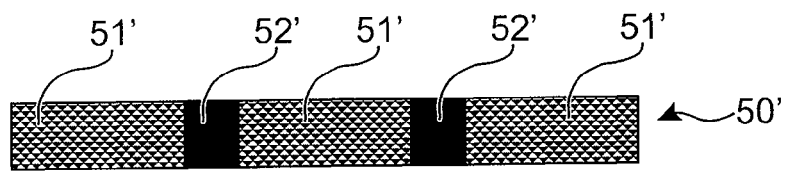

FIGS. 6a to 6c schematically illustrate a fifth example of manufacturing an ion/electron-conducting composite polymer membrane 50' according to the invention.

This membrane, which is represented in FIG. 6c, seen as a transverse cross section, comprises, as in the preceding examples, three gas-tight ion-conducting polymer portions 51' and two electron-conducting polymer portions 52', which are also gas-tight, each electron-conducting portion 52' being inserted between two ion-conducting portions 51'.

In this example, the membrane is manufactured, as in the first two examples, by treating a porous matrix of which three first portions are intended to form the ion-conducting portions 51' of the membrane and two other portions are intended to form the electron-conducting portions 52' of the membrane, but this matrix is composed of an intrinsically ion-conductive polymer contrary to the porous matrices used in the first two examples.

Thus, as can be seen in FIG. 6a, the treatment consists, firstly, in depositing an electron-conductive material in the only portions of a porous matrix 50 which are intended to form the electron-conducting portions 52' of the membrane, this deposition being carried out in the same way as in the first two examples. Thus, the matrix 50 shown in FIG. 6b, which comprises three ion-conducting portions 51 and two electron-conducting portions 52, is obtained.

Then, a treatment is applied to the whole of the porous matrix that makes it possible to obtain the softening of the polymer which forms it and the blocking of the pores of this matrix by deformation of the thus softened polymer. The whole of the matrix is thus rendered gas-tight and the membrane 50' shown in FIG. 6c is obtained.

Figure 7:
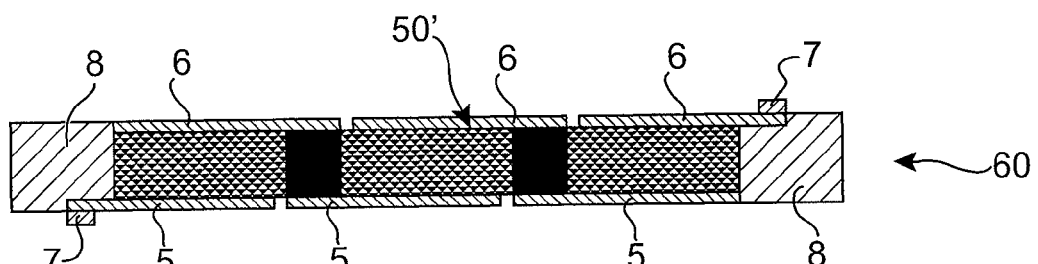
FIG. 7 schematically illustrates, seen as a transverse cross section, a cell core suitable for being incorporated into the composition of a planar fuel cell and comprising a composite polymer membrane such as shown in FIG. 6c.

Reference is now made to FIG. 7 which schematically illustrates, seen as a transverse cross section, a cell core 60 suitable for being incorporated into the composition of a planar fuel cell, which comprises:

a composite polymer membrane 50' identical to that shown in FIG. 6c;

a succession of anodes 5 on one of the main sides of the membrane, each anode being arranged on this side so as to be in surface contact with it;

a succession of cathodes 6 on the other of the main sides of the membrane, each cathode being arranged on this side so as to be in surface contact with it and the cathodes being offset relative to the anodes so that the cathodes and the anodes located opposite each other cover the same portion of ion-conducting membrane but do not cover the same portion of electron-conducting membrane;

an electron collector 7 at each of the ends of the membrane/electrodes assembly; and a peripheral seal 8 over the entire circumference of the membrane 50'.

Production of a Cell Core Comprising a Composite Polymer Membrane Manufactured According to the Second Example Described Above A woven fabric composed of an ethylene/tetrafluoroethylene copolymer available from Sefar Fyltis under the name Fluortex® 09-105/32, measuring 20 cm long by 5 cm wide, was used as a porous matrix.

Using a mechanical mask, electron-conducting properties were conferred on two portions of this woven fabric, each measuring 2.5 cm long by 5 cm wide and spaced 5 cm apart from one another by PVD deposition of gold.

This PVD deposition was, firstly, carried out on one of the sides of the matrix in a deposition chamber having a pressure of $1 \times 10^{-6}$ mbar, by sputtering of a 20 cm diameter gold target under an argon plasma (having a pressure equal to 1.3 Pa) generated by a low-frequency generator having a power of 100 W, for 5 minutes.

The plasma was then stopped for 5 minutes. This cycle is repeated 4 times in order to obtain a deposition thickness of 500 nm, then the woven fabric was turned over in order to carry out the same deposition on the other side of this woven fabric.

At the end of these operations, the woven fabric had two electron-conducting portions that were 2.5 cm long by 5 cm wide. The conductivity of the woven fabric in these zones, as measured by impedance spectroscopy, was 0.5 S/cm.

Furthermore, films of a Nafion® precursor were manufactured by extrusion of granules of this precursor that came from DuPont de Nemours, on a ThermoElectron extruder comprising 6 heating zones set at a temperature of 230° C. The films measured 100 microns in thickness due to the use of a calendar frame at the outlet of the extrusion die (coat-hanger-type sheet die with a width of 20 cm).

They were then deposited on the surface of the portions of the woven fabric which had not been rendered electron-conductive.

The woven fabric was brought to a temperature of 200° C. under 30 bar of pressure in a uniaxial press for 5 minutes, which made it possible to incorporate the proton-conductive polymer into the woven fabric.

The electron-conducting portions of the woven fabric were then brought to a temperature of 260° C. for 2 minutes under a pressure of 10 MPa to induce, in these portions, the softening of the woven fabric and to thus obtain their gas-tightness.

The matrix was then immersed in a 2M potassium hydroxide solution at 80° C. for 4 hours to convert the sulphonyl functional groups of the Nafion® precursor to sulphonic functional groups.

Next, a fuel cell core was produced by depositing, on the two sides of the composite polymer membrane thus obtained, ETEK electrodes (with a platinum loading of 0.5 mg/cm$^2$).

The assembly was press moulded for 3 minutes at 150° C. under 50 bar to ensure a good interface between the electrodes and the membrane.

The measurement of the electrochemical performances of this cell core, in a Globtech-type test rig, with a 500 ml/min injection of hydrogen at the anode and a 500 ml/min injection of oxygen at the cathode, showed that its rest potential was 2.7 V and that its voltage was 1.5 V under a current of 6 A.

Production of a Fuel Cell Core Comprising a Composite Polymer Membrane Manufactured According to the Fifth Example Described Above A proton-conductive woven fabric measuring 200 microns in thickness and having meshes of 50×50 µm$^2$ was manufactured from Nafion® granules.

Electron-conducting properties were conferred on two portions of this woven fabric in the same way as that described above.

Once the electron-conductive portions were created, the whole of the woven fabric was hot-pressed at 210° C. under a pressure of 30 bar for 5 minutes in order to induce the softening of the woven fabric and obtain its gas-tightness.

The woven fabric was then immersed in a 2M potassium hydroxide solution at 80° C. for 4 hours to convert the sulphonyl functional groups of the Nafion® precursor to sulphonic functional groups.

Next, a fuel cell core was produced by depositing, on the two sides of the composite polymer membrane thus obtained, ETEK electrodes (with a platinum loading of 0.5 mg/cm$^2$). The assembly was press moulded for 3 minutes at 150° C. under 50 bar to ensure a good interface between the electrodes and the membrane.

The measurement of the electrochemical performances of this cell core, in a Globtech-type test rig, with a 500 ml/min injection of hydrogen at the anode and a 500 ml/min injection of oxygen at the cathode, showed that its voltage was 2.1 V under a current of 6 A.

The invention is in no way limited to the examples which have just been described.

Thus, in particular, although these examples all relate to the manufacture of composite polymer membranes which comprise three ion-conducting portions and two electron-conducting portions, it goes without saying, however, that their teaching is totally transposable to the manufacture of membranes comprising a different number of ion-conducting portions and, therefore, a different number of electron-conducting portions.

In a similar manner, the teaching of the examples described above is totally transposable to the manufacture of composite polymer membranes that are in a form other than that of a film.

REFERENCES CITED

[1] WO-A-02/054522
[2] U.S. Pat. No. 5,863,672

The invention claimed is:

1. A process for manufacturing an ion/electron-conducting composite polymer membrane, comprising at least two gas-tight ion-conducting polymer portions joined together directly by a gas-tight electron-conducting polymer portion, wherein the process comprises:

a) depositing an electron-conductive material in the pores of a porous matrix composed of a polymer and comprising at least two portions intended to be filled with an ion conductor, joined together directly by a portion intended to be filled with an electron-conductive material, this deposition being limited to the portion of the porous matrix intended to be filled with the electron-conductive material;

b) applying, to the portion of the porous matrix filled with the electron-conductive material, a treatment for obtaining the softening of the polymer that forms this matrix portion and the blocking of the pores of said matrix portion by deformation of the thus softened polymer; and c) filling, with an ion-conductive material, the porous matrix portions intended to be filled with the ion-conductive material.

2. Process according to claim 1, in which the porous matrix is composed of a polymer devoid of any intrinsic ion-conducting property.

3. The process according to claim 1, wherein the electron-conductive material is deposited by chemical vapour deposition (CVD), by physical vapour deposition (PVD) or by an "electroless" process.

4. The process according to claim 1, wherein the treatment for softening the polymer is a heat treatment, an ultrasound treatment or a high-frequency radiation treatment.

5. The process according to claim 1, wherein the filling, with an ion-conductive material, of the porous matrix portions intended to be filled with the ion-conductive material is carried out by impregnating these portions with a solution containing the ion-conductive material in a solvent.

6. The process according to claim 1, wherein the filling, with an ion-conductive material, of the porous matrix portions intended to be filled with the ion-conductive material is carried out by impregnating these portions with a solution containing a precursor of the ion-conductive material in a solvent, then by secondarily applying, to said portions, a treatment to induce the conversion of this precursor to said ion-conductive material.

7. The process according to claim 1, wherein the filling, with an ion-conductive material, of the porous matrix portions intended to be filled with the ion-conductive material is carried out by depositing, on these porous matrix portions, the ion-conductive material in the form of a film, then by secondarily applying, to said portions, a treatment for melting this film and thus infiltrating the ion-conductive material into said porous matrix portions.

8. A process for manufacturing an ion/electron-conducting composite polymer membrane, comprising at least two gas-tight ion-conducting polymer portions joined together directly by a gas-tight electron-conducting polymer portion, which process comprises:

a) depositing an electron-conductive material in the pores of a porous matrix composed of a polymer and comprising at least two portions intended to be filled with an ion-conductive material and at least a portion intended to be filled with an electron-conductive material, this deposition being limited to the portion of the porous matrix intended to be filled with the electron-conductive material;

b) filling, with an ion-conductive material, the porous matrix portions intended to be filled with the ion-conductive material, and c) applying, to the portion of the porous matrix filled with the electron-conductive material, a treatment for obtaining the softening of the polymer that forms this matrix portion and the blocking of the pores of said matrix portion by deformation of the thus softened polymer.

9. The process according to claim 8, wherein the porous matrix is composed of a polymer devoid of any intrinsic ion-conducting property.

10. The process according to claim 8, wherein the electron-conductive material is deposited by chemical vapour deposition (CVD), by physical vapour deposition (PVD) or by an "electroless" process.

11. The process according to claim 8, wherein the treatment for softening the polymer is a heat treatment, an ultrasound treatment or a high-frequency radiation treatment.

12. The process according to claim 8, wherein the filling, with an ion-conductive material, of the porous matrix portions intended to be filled with the ion-conductive material is carried out by impregnating these portions with a solution containing the ion-conductive material in a solvent.

13. The process according to claim 8, wherein the filling, with an ion-conductive material, of the porous matrix portions intended to be filled with the ion-conductive material is carried out by impregnating these portions with a solution containing a precursor of the ion-conductive material in a solvent, then by secondarily applying, to said portions, a treatment to induce the conversion of this precursor to said ion-conductive material.

14. The process according to claim 8, wherein the filling, with an ion-conductive material, of the porous matrix portions intended to be filled with the ion-conductive material is carried out by depositing, on these porous matrix portions, the ion-conductive material in the form of a film, then by secondarily applying, to said portions, a treatment for melting this film and thus infiltrating the ion-conductive material into said porous matrix portions.

15. A process for manufacturing an ion/electron-conducting composite polymer membrane, comprising at least two gas-tight ion-conducting polymer portions joined together directly by a gas-tight electron-conducting polymer portion, which process comprises:

a) depositing an electron-conductive material in the pores of a porous matrix composed of a polymer;

b) cutting the porous matrix filled with an electron-conductive material into a plurality of segments;

c) forming a composite polymer membrane by inserting one of the segments obtained in step b) between at least two gas-tight ion-conducting polymer segments and firmly joining these segments together; and d) applying, to the segment of porous matrix filled with the electron-conductive material present in the composite polymer membrane obtained in step c), a treatment for obtaining the softening of the polymer that forms this matrix segment and the blocking of the pores of said matrix segment by deformation of the thus softened polymer.

16. The process according to claim 15, wherein the ion-conducting polymer segments are obtained by cutting a porous matrix composed of an intrinsically ion-conductive polymer or of a polymer devoid of any intrinsic ion-conducting property that is made ion-conductive by incorporation of an ion-conductive material.

17. The process according to claim 15, wherein the firm attachment of the segments is carried out by hot pressing.

18. The process according to claim 15, wherein the porous matrix is composed of a polymer devoid of any intrinsic ion-conducting property.

19. The process according to claim 15, wherein the electron-conductive material is deposited by chemical vapour deposition (CVD), by physical vapour deposition (PVD) or by an "electroless" process.

20. The process according to claim 15, wherein the treatment for softening the polymer is a heat treatment, an ultrasound treatment or a high-frequency radiation treatment.

21. A process for manufacturing an ion/electron-conducting composite polymer membrane, comprising at least two gas-tight ion-conducting polymer portions joined together directly by a gas-tight electron-conducting polymer portion, which process comprises:
   a) depositing an electron-conductive material in the pores of a porous matrix composed of a polymer;
   b) applying, to the porous matrix, a treatment for obtaining the softening of the polymer which forms it and the blocking of the pores of this matrix by deformation of the thus softened polymer;
   c) cutting the matrix obtained in step b) into a plurality of segments; and
   d) forming a composite polymer membrane by inserting one of these segments obtained in step c) between at least two gas-tight ion-conducting polymer segments and firmly joining these segments together.

22. The process according to claim 21, wherein the porous matrix, is composed of a polymer devoid of any intrinsic ion-conducting property.

23. The process according to claim 21, wherein the electron-conductive material is deposited by chemical vapour deposition (CVD), by physical vapour deposition (PVD) or by an "electroless" process.

24. The process according to claim 21, wherein the treatment for softening the polymer is a heat treatment, an ultrasound treatment or a high-frequency radiation treatment.

25. The process according to claim 21, wherein the ion-conducting polymer segments are obtained by cutting a porous matrix composed of an intrinsically ion-conductive polymer or of a polymer devoid of any intrinsic ion-conducting property that is made ion-conductive by incorporation of an ion-conductive material.

26. The process according to claim 21, wherein the firm attachment of the segments is carried out by hot pressing.

27. A process for manufacturing an ion/electron-conducting composite polymer membrane, comprising at least two gas-tight ion-conducting polymer portions joined together directly by a gas-tight electron-conducting polymer portion, which process comprises:
   a) depositing an electron-conductive material in the pores of a porous matrix composed of an intrinsically ion-conductive polymer and comprising at least two portions intended to remain ion-conductive, joined together directly by a portion intended to be filled with an electron-conductive material, this deposition being limited to the portion of the porous matrix intended to be filled with the electron-conductive material; and
   b) applying, to the porous matrix, a treatment for obtaining the softening of the polymer that forms this matrix and the blocking of the pores of said matrix by deformation of the thus softened polymer.

28. The process according to claim 27, wherein the electron-conductive material is deposited by chemical vapour deposition (CVD), by physical vapour deposition (PVD) or by an "electroless" process.

29. The process according to claim 27, wherein the treatment for softening the polymer is a heat treatment, an ultrasound treatment or a high-frequency radiation treatment.

* * * * *